United States Patent

Sato

[11] Patent Number: 5,301,899
[45] Date of Patent: Apr. 12, 1994

[54] BRAKE MECHANISM FOR A FISHING REEL

[75] Inventor: Jun Sato, Sakai, Japan

[73] Assignee: Shimano Inc., Osaka, Japan

[21] Appl. No.: 889,242

[22] Filed: May 28, 1992

[30] Foreign Application Priority Data

Jun. 5, 1991 [JP] Japan .................. 3-133914

[51] Int. Cl.⁵ ............................................. A01K 89/02
[52] U.S. Cl. ................................... 242/288; 310/103; 188/267
[58] Field of Search ................ 242/288, 289, 158; 188/267; 310/93, 103, 104, 105

[56] References Cited

U.S. PATENT DOCUMENTS

| | | |
|---|---|---|
| 4,013,241 | 3/1977 | Gray . |
| 4,152,617 | 5/1979 | Janson .................. 310/103 |
| 4,535,954 | 8/1985 | Worth et al. .......... 242/288 |
| 4,586,674 | 5/1986 | Nakajima .............. 242/288 |
| 4,601,439 | 7/1986 | Moosberg .............. 310/93 X |
| 4,788,463 | 11/1988 | Layh ...................... 310/93 X |
| 4,821,975 | 4/1989 | Uetsuki et al. ........ 242/288 |
| 4,826,150 | 5/1989 | Mimoura ................ 310/103 X |
| 4,830,308 | 5/1989 | Puryear ................. 242/288 |

FOREIGN PATENT DOCUMENTS 308116 11/1944 Japan .
1597464 10/1990 U.S.S.R. ............... 188/267

Primary Examiner—Clifford D. Crowder
Assistant Examiner—John J. Calvert
Attorney, Agent, or Firm—Dickstein, Shapiro & Morin

[57] ABSTRACT

A brake mechanism for a fishing reel has a spool shaft, braking pieces radially displaceably disposed on the spool shaft or a rotating system interlocked with a spool, an annular friction member contactable by the braking pieces under a centrifugal force occurring with rotation of the spool, thereby applying a braking force to the spool, and a braking force adjusting device operable from outside a reel body for adjusting a pressure of contact between the braking pieces and friction member when the spool is rotated. The braking force adjusting device includes permanent magnets provided on the braking pieces, magnets opposed to the braking pieces across the friction member, and a mechanism for adjusting quantities of magnetic flux applied from the magnets to the braking pieces.

11 Claims, 4 Drawing Sheets

BRAKE MECHANISM FOR A FISHING REEL

BACKGROUND OF THE INVENTION

1. Field of the Invention

This invention relates to a brake mechanism for a fishing reel, and more particularly to an improvement in a brake mechanism having radially displaceable braking pieces disposed on a spool shaft or a rotating system interlocked with a spool, and a friction member contactable by the braking pieces under the centrifugal force occurring with rotation of the spool, thereby applying a braking force to the spool rotation.

2. Description of the Related Art

A known brake mechanism as constructed above (hereinafter called a centrifugal brake) is disclosed in Japanese Patent Publication No. 1955-8116, for example. This centrifugal brake includes rod-like members extending radially of a shaft rotatable with a spool, tubular braking pieces slidably mounted on the rod-like members, and an annular friction member disposed outwardly of a locus of revolution of the braking pieces. When the spool rotates, the braking pieces move into contact with the friction member and a braking force based on the friction is applied to the spool rotation.

The above centrifugal brake applies the braking force reliably with rotation of the spool immediately after bait casting action, and is often employed in existing bait-casting reels. To adjust the braking force of the known centrifugal brake, the reel body is disassembled to expose the brake and replace the braking pieces with those having a different coefficient of friction or a different weight.

On the other hand, lures and other baits are changed frequently in a fishing mode called bait casting. It is sometimes desirable to adjust the braking force after changing the baits.

This type of brake mechanism is intended for suppressing backlash at a casting time. The heavier the bait is, the stronger the braking force should be.

With the conventional brake mechanism, however, adjustment of the braking force requires a troublesome operation as noted above. Moreover, the braking force is adjustable only stepwise, which makes it difficult to adjust the braking force with subtlety. Thus, there is room for improvement.

The braking force is steplessly adjustable in the case of what is known as a mag-brake having an electric conductor mounted in a spool driving system, and magnets positionally adjustably mounted on a reel body. However, the mag-brake cannot apply the braking force immediately after bait casting action as reliably as the centrifugal brake. Thus, there are demands for a centrifugal brake whose braking force is steplessly adjustable.

SUMMARY OF THE INVENTION

The object of the present invention is to provide an improved centrifugal brake mechanism whose braking force is steplessly adjustable without necessitating a troublesome operation.

The above object is fulfilled, according to the present invention, by a brake mechanism for a fishing reel comprising braking pieces included in a rotating system, a friction member included in a stationary portion of the reel and contactable by the braking pieces to apply a braking force to the spool, and a braking force adjusting device operable from outside a reel body for adjusting a pressure of contact between the braking pieces and friction member when the spool is rotated.

This brake mechanism has the following functions and effects:

Where the above features are arranged as shown in FIG. 1, for example, the braking force adjusting device A includes permanent magnets 6 provided on braking pieces 7, and magnets 10 arranged opposite the braking pieces 7 across a friction member 8. The permanent magnets 6 and magnets 10 have polarities for magnetically drawing the braking pieces 7 toward the friction member 8. The magnets 10 are radially movably supported. For adjusting the braking force, a dial 12 exposed outside a reel body is operated for radially moving the magnets 10 arranged outwardly of the friction member 8. The force of the magnets 10 to draw the braking pieces 7 is increased or decreased in proportion to the movement of the magnets 10. Consequently, when the spool 2 is rotated, the pressure of contact between the braking pieces 7 and friction member 8 is varied to vary the braking force.

Thus, according to the present invention, the spool 2 in rotation is subjected to the braking force based on the centrifugal force and the braking force based on the magnetic force, which are comparable to the characteristics of a centrifugal brake. The braking force adjusting device is operable from outside the reel body for steplessly adjusting the braking force based on the magnetic force.

The present invention provides the improved centrifugal brake mechanism whose braking force is steplessly adjustable with a relatively simple operation, without impairing the excellent characteristics of a centrifugal brake.

Other features and advantages of the present invention will be apparent from the following description of the preferred embodiments.

DETAILED DESCRIPTION OF THE PREFERRED EMBODIMENTS

A brake mechanism for a fishing reel according to the present invention will be described in detail with reference to the drawings.

Figure 4:
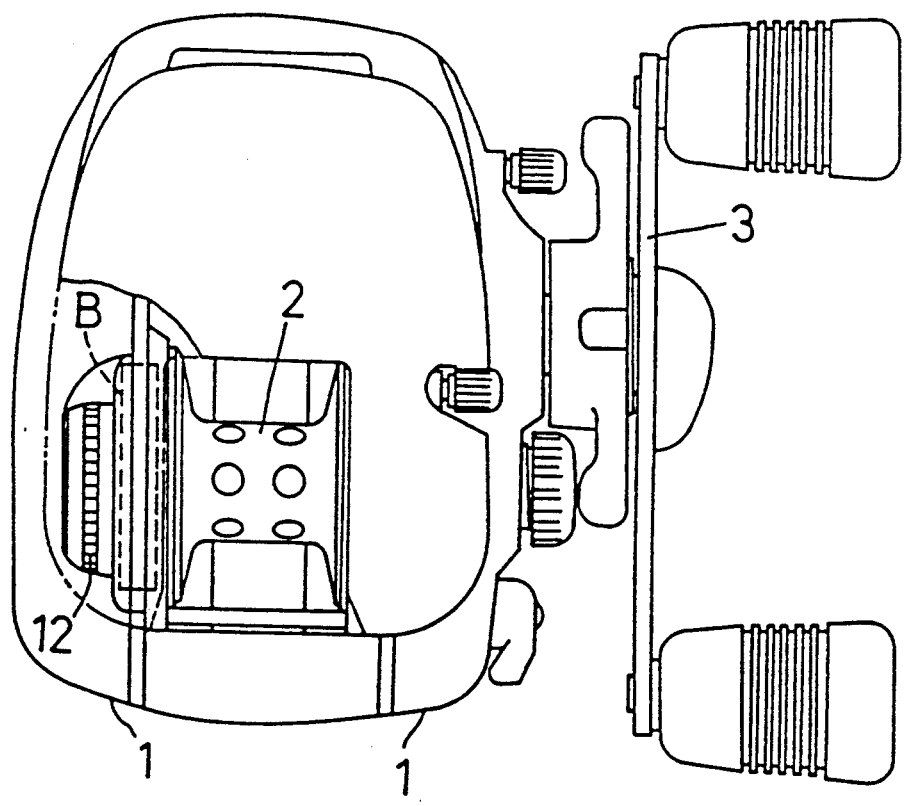
FIG. 4 is a plan view of a fishing reel.

FIG. 4 shows a baitcasting reel embodying the present invention. The reel comprises right and left side cases 1 constituting a reel body, and a spool 2 mounted between the side cases 1 for winding a fishing line (not shown). A handle 3 is disposed outwardly of the right side case 1, and a brake mechanism B is contained in the left side case 1.

The reel body includes a clutch mechanism (not shown) mounted in a transmission line for transmitting drive from the handle 3 to the spool 2.

Figure 1:
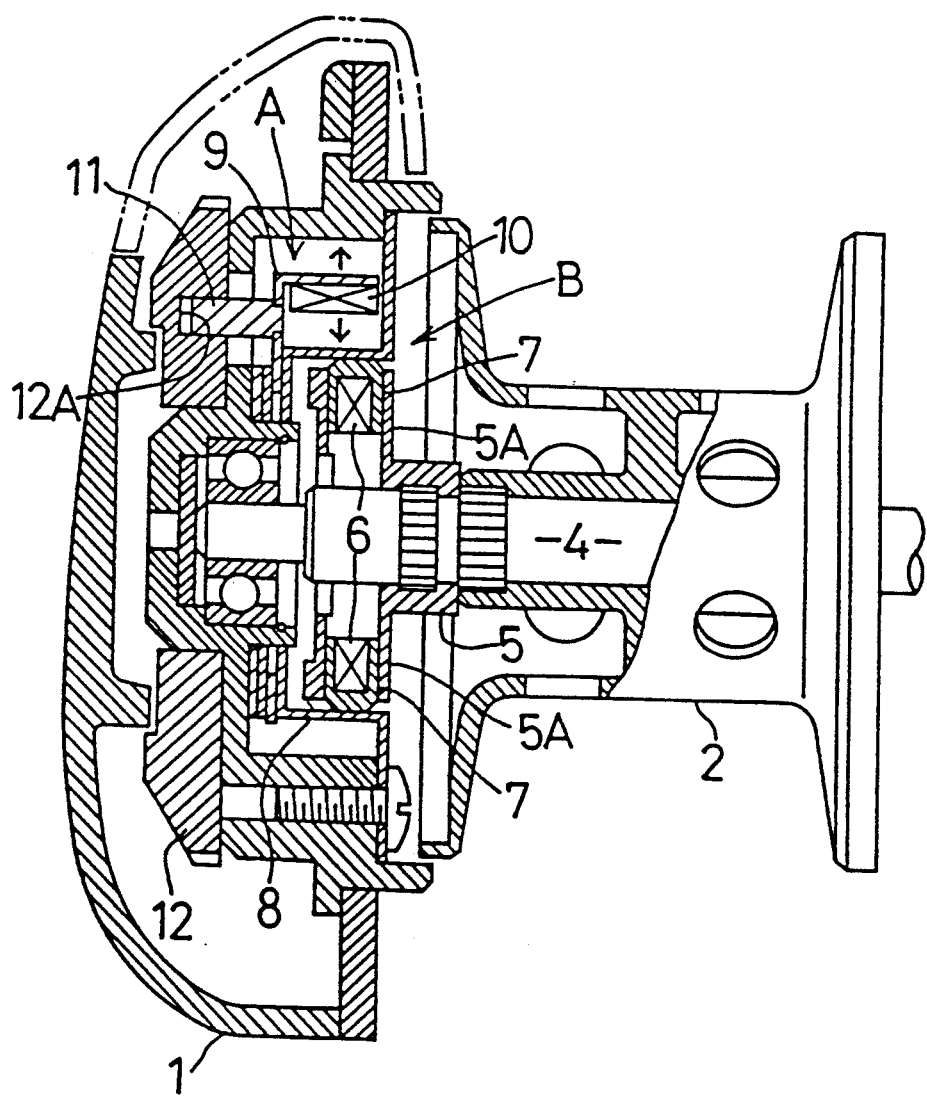
FIG. 1 is a rear view in vertical section showing a brake mechanism according to the present invention.
Figure 2:
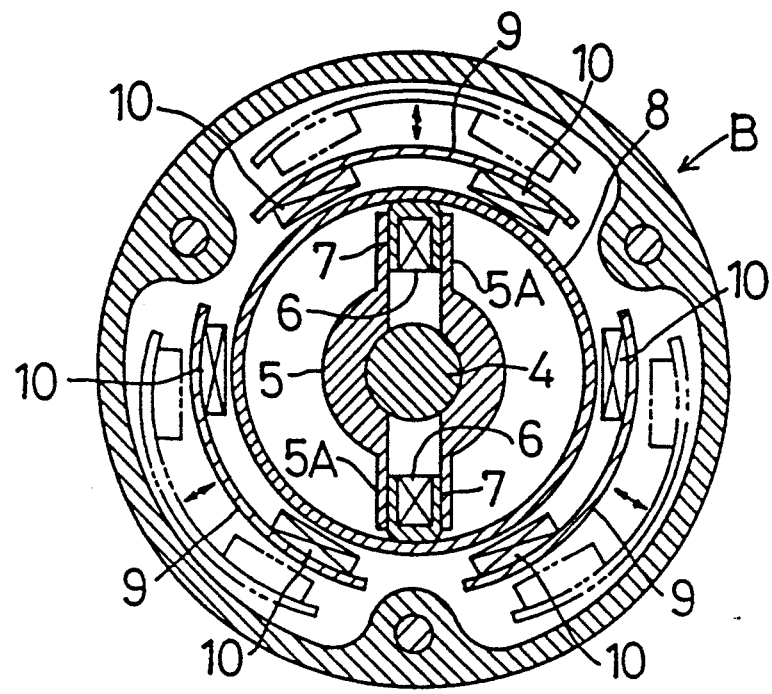
FIG. 2 is a side view in vertical section of the brake mechanism.
Figure 3:
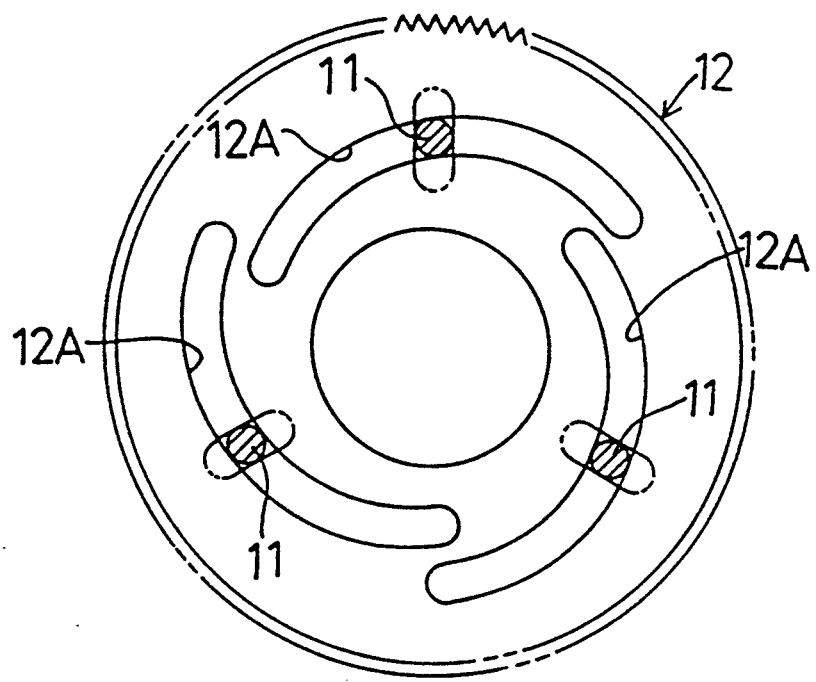
FIG. 3 is a schematic side view of a dial.

As shown in FIGS. 1 through 3, the brake mechanism B includes a pair of braking pieces 7 radially slidably supported in a pair of tubular portions 5A of a holder 5 fixed to a spool shaft 4 rotatable with the spool 2, each braking piece 7 containing a first magnet 6 which is a permanent magnet, an annular friction member 8 formed of a non-magnetic material and disposed outwardly of a locus of revolution of the braking pieces 7, a plurality of second magnets 10 attached to radially movable shift members 9 and opposed to the braking pieces 7 across the friction member 8, and a dial 12 defining cam grooves 12A engaging pins 11 formed on the shift members 9. The first and second magnets 6 and 10 have polarities to attract each other. The cam grooves 12A are shaped to move the second magnets 10 radially when the dial 12 is turned.

The first and second magnets 6 and 10 and the construction for positionally adjusting the second magnets 10 constitute a braking force adjusting device A.

At a casting time with the clutch mechanism disengaged, the centrifugal force produced by rotation of the spool 2 causes the braking pieces 7 to contact the friction member 8. The contact between the braking pieces 7 and friction member 8 under magnetic forces results in a braking force acting on the spool 2. The dial 12 is rotatable by an operation outside the reel body, to vary a contact pressure due to the magnetic forces. Thus, the braking force of the brake mechanism B is steplessly adjustable.

The above embodiment may be modified as follows:

(a) The first magnets (permanent magnets) and second magnets may have polarities to repel each other.

(b) The first magnets (permanent magnets) may be replaced by pieces of a magnetic substance such as iron.

Figure 5:
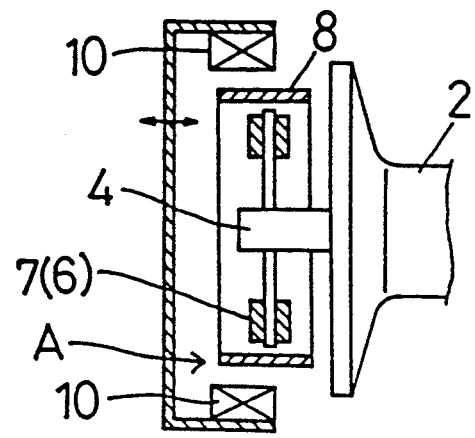
FIG. 5 is a schematic fragmentary view of another embodiment.

(c) FIG. 5 shows another embodiment in which first magnets 6 or pieces of a magnetic substance are formed integral with braking pieces 7, and second magnets 10 are movable axially of a spool shaft 4. Movement of the second magnets 10 adjusts quantities of magnetic flux acting on the braking pieces 7.

Figure 6:
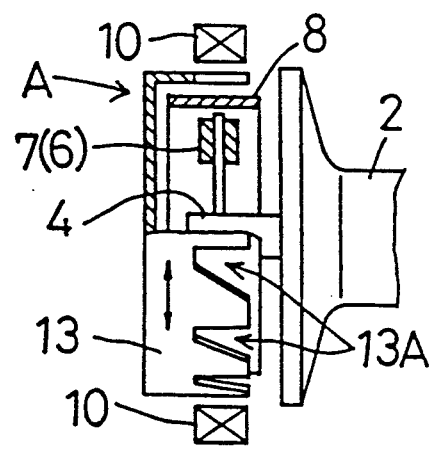
FIG. 6 is a schematic fragmentary view of a further embodiment.

(d) FIG. 6 shows a further embodiment in which first magnets 6 or pieces of a magnetic substance are formed integral with braking pieces 7. A shield 13 formed of a magnetic substance is disposed between second magnets 10 and friction member 8 to be rotatable about an axis of rotation of a spool 2. For adjusting the braking force, the shield 13 is rotated whereby quantities of magnetic flux shielded are varied by means of slits 13A formed in the shield 13.

Figure 7:
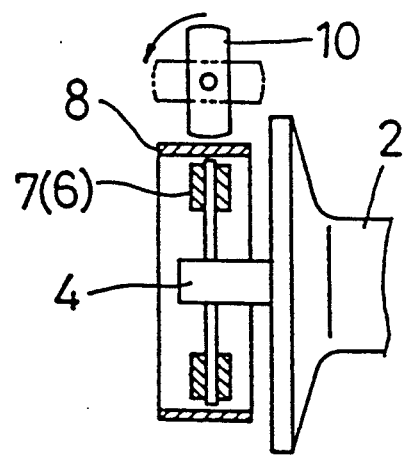
FIG. 7 is a schematic fragmentary view of a still further embodiment.

(e) FIG. 7 shows a still further embodiment in which braking pieces 7 have first magnets 6, with second magnets 10 rotatably supported to effect magnetic attraction and repellence.

(f) A large number of second magnets 10 may be arranged circumferentially to reduce circumferential non-uniformity of flux density.

(g) Electromagnets may be used, in which case the braking force is adjusted by varying electric currents supplied to the electromagnets.

What is claimed is:

1. A brake mechanism for a fishing reel comprising:
   a spool, and a rotating system rotatably interlocked with said spool, said rotating system including a spool shaft for supporting said spool;
   braking pieces radially displaceably disposed on said rotating system, said braking pieces being rotatable with said spool;
   an annular friction member fixedly disposed outwardly of a locus of revolution of said braking pieces, said brake mechanism being arranged such that said braking pieces are displaced radially outwardly by centrifugal force into contact with said friction member during rotation of said spool, to thereby apply a braking force to said spool; and
   braking force adjusting means operable from outside a reel body for adjusting the braking force applied to said spool, said braking force adjusting means including:
   magnetic material provided in said braking pieces;
   magnets positioned such that said friction member is located between said magnets and said braking pieces; and
   shift members for supporting said magnets; and
   wherein said brake mechanism is arranged such that the adjustment of the braking force applied to said spool is effected by operating said shift members to vary the distance between said braking pieces and said magnets, to thereby vary the magnitude of the magnetic force between said braking pieces and said magnets.

2. A brake mechanism as claimed in claim 1, wherein said shift members (9) are movable in radial directions relative to said spool shaft (4).

3. A brake mechanism as claimed in claim 1, further comprising a side case having a groove, and a dial (12) rotatably attached to said side case, said dial including a cam groove (12A), and wherein at least one of said shift members includes a pin (11), said pin being inserted into said groove of said side case, and wherein said pin is engaged within said cam groove, such that rotation of said dial causes radial movement of said shift members relative to said spool shaft.

4. A brake mechanism as claimed in claim 1, wherein said shift members are movable in a direction that is parallel to said spool shaft.

5. A brake mechanism for a fishing reel comprising:
   a spool, and a rotating system rotatably interlocked with said spool, said rotating system including a spool shaft for supporting said spool;
   braking pieces radially displaceably disposed on said rotating system, said braking pieces being rotatable with said spool;
   an annular friction member fixedly disposed outwardly of a locus of revolution of said braking pieces, said brake mechanism being arranged such that said braking pieces are displaced radially outwardly by centrifugal force into contact with said friction member during rotation of said spool, to thereby apply a braking force to said spool; and
   braking force adjusting means operable from outside a reel body for adjusting the braking force applied to said spool, said braking force adjusting means including:
   magnetic material provided in said braking pieces;
   magnets positioned such that said friction member is located between said magnets and said braking pieces; and
   a magnetic shield interposed between said magnets and said friction member, said shield being rotatable about the axis of rotation of said spool, said shield defining a slit (13A); and
   wherein the adjustment of the braking force applied to said spool is effected by moving said shield to obstruct the magnetic flux between said braking pieces and said magnets, to thereby vary the magnitude of the magnetic force between said braking pieces and said magnets.

6. A brake mechanism for a fishing reel comprising:
a spool, and a rotating system rotatably interlocked with said spool, said rotating system including a spool shaft for supporting said spool;
braking pieces radially displaceably disposed on said rotating system, said braking pieces being rotatable with said spool;
an annular friction member fixedly disposed outwardly of a locus of revolution of said braking pieces, said brake mechanism being arranged such that said braking pieces are displaced radially outwardly by centrifugal force into contact with said friction member during rotation of said spool, to thereby apply a braking force to said spool; and
braking force adjusting means operable from outside a reel body for adjusting the braking force applied to said spool, said braking force adjusting means including:
magnetic material provided in said braking pieces; and
magnets positioned such that said friction member is located between said magnets and said braking pieces, each of said magnets having an axis of rotation, and means for rotating said magnets about said axes to vary the respective angles between said magnets and said braking pieces to vary the magnitude of the magnetic force between said magnets and said braking pieces.

7. A brake mechanism for a fishing reel comprising:
a spool, and a rotating system rotatably interlocked with said spool, said rotating system including a spool shaft for supporting said spool;
braking pieces radially displaceably disposed on said rotating system, said braking pieces being rotatable with said spool;
an annular friction member fixedly disposed outwardly of a locus of revolution of said braking pieces, said brake mechanism being arranged such that said braking pieces are displaced radially outwardly by centrifugal force into contact with said friction member during rotation of said spool, to thereby apply a braking force to said spool; and
braking force adjusting means operable from outside a reel body for adjusting the braking force applied to said spool, said braking force adjusting means including:
magnetic material provided in said braking pieces;
magnets positioned such that said friction member is located between said magnets and said braking pieces; and
shift members for supporting said magnets; and
wherein said brake mechanism is arranged such that the adjustment of the braking force applied to said spool is effected by operating said shift members to vary the distance between said braking pieces and said magnets, to thereby vary the magnitude of the magnetic force between said braking pieces and said magnets; and
wherein said brake mechanism further includes a side case having a groove, and a dial rotatably attached to said side case, said dial including a cam groove, and wherein at least one of said shift members includes a pin, said pin being inserted into said groove of said side case, and wherein said pin is engaged within said cam groove, such that rotation of said dial causes radial movement of said shift members relative to said spool shaft to vary the distance between said braking pieces and said magnets, to thereby vary the magnitude of the magnetic force between said braking pieces and said magnets.

8. A brake mechanism as claimed in claim 7, wherein said magnetic material includes a permanent magnet.

9. A brake mechanism as claimed in claim 7, wherein said magnetic material comprises iron.

10. A brake mechanism as claimed in claim 7, wherein said magnetic force is an attracting force.

11. A brake mechanism as claimed in claim 7, wherein said magnetic force is a repelling force.

* * * * *